United States Patent [19]

Dénervaud

[11] 3,850,790

[45] Nov. 26, 1974

[54] TRANSPARENT COMPOSITE FILM OF METHYL METHACRYLATE-BUTADIENE-STYRENE AND POLYVINYLIDENE CHLORIDE

[75] Inventor: Marcel Dénervaud, Fribourg, Switzerland

[73] Assignee: Denervaud S.A. Technoplastic, Villars-sur-Glane, Switzerland

[22] Filed: Sept. 7, 1972

[21] Appl. No.: 286,887

[30] Foreign Application Priority Data
Sept. 20, 1971 Switzerland.................. 13692/71

[52] U.S. Cl................. 161/253, 156/244, 161/254, 161/255, 161/256, 264/95, 264/209
[51] Int. Cl........................ B32b 27/08, B29c 5/06
[58] Field of Search ........... 156/244; 161/253, 254, 161/255, 256; 264/209, 95

[56] References Cited
UNITED STATES PATENTS

| 2,987,102 | 6/1961 | Heinrichs | 161/253 X |
| 3,218,224 | 11/1965 | Osborn | 161/253 X |
| 3,322,614 | 5/1967 | Seiferth et al. | 161/254 |
| 3,356,560 | 12/1967 | Callum | 161/253 X |
| 3,595,735 | 7/1971 | Tyrrell | 161/254 X |
| 3,726,743 | 4/1973 | Reifenhauser et al. | 156/244 X |

Primary Examiner—George F. Lesmes
Assistant Examiner—Patricia C. Ives
Attorney, Agent, or Firm—Oblon, Fisher, Spivak, McClelland & Maier

[57] ABSTRACT

A composite plastic film is produced by extruding a first support film of methyl methacrylate-butadiene-styrene terpolymer, blow extruding a second film of polyvinylidene chloride, contacting said first and second films in laminating relationship to form a composite and applying sufficient heat and pressure to said composite to effect mutual bonding between said first and second films.

4 Claims, No Drawings 3,850,790

TRANSPARENT COMPOSITE FILM OF METHYL METHACRYLATE-BUTADIENE-STYRENE AND POLYVINYLIDENE CHLORIDE

BACKGROUND OF THE INVENTION

1. Field of the Invention

This invention relates to a process for preparing a transparent composite packaging film which is characterized by high air and moisture impermeability, and which will not generate toxic or corrosive exhaust gases upon ordinary combustion.

2. Description of Prior Art

Most packaging films currently on the market are composed of polyvinylchloride (PVC) or polyvinylidenechloride (PVDC). One substantial difficulty with the use of such materials is that when they are subjected to combustion, they tend to generate large quantities of chlorine or hydrochloric acid waste gases, often in amounts as high as 40 – 55% by weight based on the weight of the original material. This results in difficulties in disposal and can be a contributing cause of air pollution. Even when the burning is conducted in enclosed incinerators, the corrosive effect of the generated hydrochloric acid or chlorine can cause destruction, or otherwise shorten the life, of the incinerator facilities.

In an attempt to find suitable alternatives to PVC or PVDC packaging films, it has been suggested to prepare films from high impact polystyrene or polyethylene. Films prepared from these materials can be disposed of easily by burning, since their products of decomposition are carbon dioxide and steam. It is quite difficult to prepare transparent films from these materials, however, and generally such films are formed in an opaque, white or colored form.

It has also been considered to prepare packaging films from extruded acrylonitrile-butadiene-styrene terpolymers. Upon burning, however, there is a slight amount of nitrogen oxide production which is not competely desirable from an environmental protection point of view.

Most recently, it has been considered to prepare packaging films from methyl methacrylate-butadiene-styrene terpolymers (MBS). It has been found that such films possess good transparency, having a transmissivity of 89 – 90%; low specific gravity, in the order of 1.1, which is about 25% lower than PVC (1.35 tp 1.4) ; and a high Izod impact resistance of 8, which is comparable to high impact resistant polystyrene. Moreover, the deformation temperature of the methyl methacrylate-butadiene-styrene terpolymer (MBS) films under a pressure of 18.5 kg/cm$^2$ is 85°C. Such materials can, therefore, be extruded and drawn at a much more rapid rate and more simply than PVC films. Other desirable aspects of MBS films is that their water vapor and oxygen permeability is lower than polystyrene films of similar thickness and they are water repellant to an extent that they will absorb only about 0.15% by weight water. Such films can thus be used under ordinary conditions in the packaging of products having high fat contents without risk of the fats becoming rancid due to oxygen or moisture permeation.

Further, MBS can be extruded into films having thicknesses of 0.1 to 1 mm., as required for packaging films, and because of their lower specific gravities, can be prepared more economically than PVC films of the same thicknesses.

Despite all of these properties, however, under certain climatic conditions, the impermeability of MBS films to water vapor is not entirely satisfactory, and hence it is unacceptable for meeting the high demands required of such uses as pharmaceutical packaging, wherein a hermetic casing may be required, or for goods destined to enter international commerce.

It has now been realized that the advantageous properties of MBS films might be combinable with the advantageous properties of PVDC films, by forming a composite laminate of the two. In the first efforts to produce such a laminate, however, the thinnest composite film which was producable was greater than 0.75 mm., i.e., greater than 0.70 mm. for the MBS support film, and greater than 0.05 mm. for the PVDC film. Although there is some utility for such thicker films, they are not as economically attractive as thinner films, nor are such thicker films as easily deformable as thinner films.

It was attempted to provide thinner films by coating an MBS support film with PVDC by deposition from a liquid medium. While in principle, thinner films are producable in this manner, such films are relatively expensive to prepare, since they require additional facilities to heat the coated films, and additional facilities to evaporate the liquid from the liquid dispersion medium.

It was then attempted to provide thinner films by using one or two adhesive inner layers, but neither reproduceable nor fully satisfactory results were obtainable thereby. When using adhesive inner layers, the cost of production was increased, the deformability of the composite film was reduced, and the transparency of the film was adversely affected.

SUMMARY OF THE INVENTION

Accordingly, it is one object of this invention to provide an economically attractive process for producing composite films of methyl methacrylate-butadiene-styrene terpolymer film and polyvinylidenechloride film.

Another object of the present invention is to provide a composite of methyl methacrylate-butadiene-styrene terpolymer film and polyvinylidenechloride film produced by the aforesaid process.

A still further object of this invention is to provide a process for preparing a thin composite of said films.

These and other objects of this invention, as will hereinafter become more readily apparent as the explanation continues, have been attained by laminating, using heat and pressure, and extruded first film of a methyl methacrylate-butadiene-styrene terpolymer, onto a second film of polyvinylidenechloride, prepared by blow extrusion.

DETAILED DESCRIPTION OF PREFERRED EMBODIMENTS

According to the present invention, a first film of a methyl methacrylate-butadiene-stryrene terpolymer is formed by extrusion. It is then heated by means of appropriate calender rolls to a temperature of 50 – 90°C., and brought into laminating contact with the blow extruder PVDC film. The composite film structure is then passed through suitable pressure rollers which causes a strong bond to be formed between the two film plys. The particularly outstanding bonding properties existing between the two plys is believed to be enhanced by the strong polarity of the MBS film, which assists in establishing an almost inseparable bond between the MBS and the PVDC film.

The MBS terpolymer used for this purpose is a conventional product. Excellent effects have been attained with an MBS terpolymer containing 80% by weight methyl methacrylate and 20% by weight butadiene-styrene The MBS film may be formed by exrusion through a fishtail die in a thickness of 0.1 to 1.1mm.

The polyvinylidenechloride used may be formed in any conventional manner. The PVDC polymer is then formed into a film by blow extrusion to a thickness of 0.01 to 0.05 mm. Any PVDC polymer which is available in the trade may be used. It is however recommendable to use polymers which are free of additive such as stabilizers and plasticizers for in particular plasticizers reduce the impermeability of the films to water vapor and gases.

The total thickness of the composite is preferably less than 0.75 mm. and more preferably, from 0.11 to 0.75 mm. The composite may be pigmented or unpigmented as desired, and when pigmented, the composite may be characterized by clear, but colored transparency, or may be fully opaque, if desired.

The composite of the present invention has been found to possess outstanding moisture and air impermeability properties which are not adversely affected by climatic changes. Since the thickness of the PVDC ply is only 0.01 to 0.05 mm., as compared with the thickness of 0.01 to 1.1 mm., the extent of chlorine or hydrochloric acid generation upon open combustion, is quite small, based on the total weight of the composite film. Moreover, the composite films of this invention retain all of the advantages of the MBS film, as well as all of the advantages of the PVDC film.

The composite film may be deep-drawn and the shaped parts will be characterized by even transparency and will have a material distribution quotient of as high as 0.56.

The term "material distribution quotient " refers to the thickness of a thermoplastic material after deep-drawing which may differ considerably in corners and on edges of parts shaped by deep-drawing. A thermoplastic material which is easily and uniformly deep-drawable is defined to be a material with a convenient material distribution quotient.

Having generally described the invention, a further understanding can be obtained by reference to certain specific Examples which are provided herein for purposes of illustration only and are not intended to be construed as limiting unless otherwise so specified.

EXAMPLE 1

An extruder with a worm ratio of 1 : 25 is loaded with a pre-heated and highly dried MBS granulate. A clear transparent film is extruded from extruder using a fishtail-type die. The thickness of the extruded film was 0.5 mm. and was extruded in a width of 1200 mm.

This film was then passed over a three-roll calander in which an upper roller, middle roller, and lower roller are heated to temperatures of 65°C., 80° – 90°c., and 50° – 60°C., respectively. The nip of the roller is set to an opening of 0.02 mm. less than the total thickness of the composite film.

Blow extruded PVDC containing no plasticizer is taken from a supply roll mounted above the tip of the nozzle of the extruder. This film had a width of 1200 mm. and a thickness of 0.025 mm. It was reeled from the supply roll and fed concurrently with the MBS film to the nip of the calender roller.

In this manner, a bubble-free, evenly and clearly transparent composite film of a ply of MBS and a ply of PVDC was obtained in a thickness of 0.505 mm. The adhesion between the films was excellent and they were considered to be inseparable.

Having now fully described the invention, it will be apparent to one of ordinary skill in the art that many changes and modifications can be made thereto without departing from the spirit or scope of the invention.

Accordingly, what is claimed and intended to be covered by Letters Patent is:

1. A process for producing a composite plastic film which consists essentially of:
   extruding a first support film of methyl methacrylate-butadiene-styrene terpolymer in a thickness of 0.1 to 1.1 mm.,
   blow extruding a second film of polyvinylidene chloride in a thickness of 0.01 to 0.05 mm.,
   contacting said first and second films in laminating relationship to form a composite and applying sufficient heat and pressure to said composite to effect mutual bonding between said first and second films.

2. The process of claim 1, wherein said first film is formed by extrusion through a fishtail die, and wherein said heat and pressure are applied to said composite by means of a multi-roller calender.

3. A composite plastic film which consists of a first ply of a methyl methacrylate-butadiene-styrene terpolymer extruded film in a thickness ranging from 0.1 to 1.1 mm and a second ply of blow extruded polyvinylidene chloride film in a thickness ranging from 0.01 to 0.05 mm, said plys being bonded by heat and pressure.

4. The composite plastic film of claim 3, wherein the total thickness of said film is from 0.11 to 0.75 mm.

* * * * *